United States Patent
Share et al.

(10) Patent No.: US 8,562,861 B2
(45) Date of Patent: Oct. 22, 2013

(54) OXYGEN SCAVENGING COMPOSITION AND ARTICLE FORMED THEREFROM

(75) Inventors: Paul Share, Wexford, PA (US); Jeffrey Niederst, Leechburg, PA (US); Richard Evans, Wexford, PA (US); Grant Schutte, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 254 days.

(21) Appl. No.: 13/123,431

(22) PCT Filed: Oct. 10, 2008

(86) PCT No.: PCT/US2008/079532
§ 371 (c)(1),
(2), (4) Date: May 16, 2011

(87) PCT Pub. No.: WO2010/042122
PCT Pub. Date: Apr. 15, 2010

(65) Prior Publication Data
US 2012/0012784 A1    Jan. 19, 2012

(51) Int. Cl.
| C09K 15/22 | (2006.01) |
| B32B 27/18 | (2006.01) |
| B32B 27/34 | (2006.01) |
| B32B 27/36 | (2006.01) |
| C08L 67/02 | (2006.01) |
| C08L 67/08 | (2006.01) |

(52) U.S. Cl.
USPC .......... 252/188.28; 428/36.1; 428/36.6; 428/220; 428/474.4; 428/480; 524/394; 524/450; 524/495; 528/272

(58) Field of Classification Search
USPC ........... 252/188.28; 428/36.1, 36.6, 220, 343, 428/474.4, 480; 524/394, 450, 495; 528/272
See application file for complete search history.

(56) References Cited

U.S. PATENT DOCUMENTS

| 1,969,709 A | 8/1934 | Bruson et al. |
| 3,625,874 A * | 12/1971 | Cottman et al. ............ 525/149 |
| 4,075,143 A | 2/1978 | Schelhaas et al. |
| 5,211,875 A | 5/1993 | Speer et al. |
| 5,324,350 A | 6/1994 | Bender et al. |
| 5,346,644 A | 9/1994 | Speer et al. |
| 5,350,622 A | 9/1994 | Speer et al. |
| 5,399,289 A | 3/1995 | Speer et al. |
| 6,083,585 A | 7/2000 | Cahill et al. |
| 6,254,804 B1 | 7/2001 | Matthews et al. |
| 6,255,248 B1 | 7/2001 | Bansleben et al. |
| 6,410,156 B1 | 6/2002 | Akkapeddi et al. |
| 6,515,067 B2 | 2/2003 | Cai et al. |
| 6,525,123 B1 | 2/2003 | Yang et al. |
| 6,559,205 B2 | 5/2003 | Cai et al. |
| 6,777,496 B2 | 8/2004 | Patel et al. |
| 6,818,151 B2 | 11/2004 | Yang et al. |
| 6,878,774 B2 | 4/2005 | Kikuchi et al. |
| 6,946,175 B2 | 9/2005 | Yang et al. |
| 7,238,300 B2 | 7/2007 | Solis et al. |
| 7,247,390 B1 | 7/2007 | Yang et al. |
| 7,390,569 B2 | 6/2008 | Kitano et al. |
| 7,915,375 B2 * | 3/2011 | Pawlow et al. ............. 528/271 |
| 2002/0072476 A1 | 6/2002 | Yoshida et al. |
| 2003/0036486 A1 | 2/2003 | Kodali |
| 2003/0152727 A1 | 8/2003 | Jerdee et al. |
| 2003/0218152 A1 | 11/2003 | Yang et al. |
| 2005/0085577 A1 | 4/2005 | Ching et al. |
| 2005/0104033 A1 | 5/2005 | Schmidt et al. |
| 2006/0202161 A1 | 9/2006 | Share et al. |
| 2006/0276368 A1 | 12/2006 | Speer et al. |
| 2008/0090042 A1 | 4/2008 | Kitahara |
| 2009/0014687 A1 | 1/2009 | Kaskel et al. |
| 2010/0051862 A1 | 3/2010 | Share et al. |
| 2012/0027974 A1 * | 2/2012 | Skillman et al. ............. 428/35.8 |

FOREIGN PATENT DOCUMENTS

| EP | 1553137 A1 | 7/2005 |
| EP | 1666925 A1 | 6/2006 |
| JP | 04063810 A | 2/1992 |
| JP | 2001042115 A | 2/2001 |
| JP | 2001072115 A | 3/2001 |
| JP | 2005008699 A | 1/2005 |
| JP | 2006206744 A | 8/2006 |
| WO | WO-01/90238 A2 | 11/2001 |
| WO | WO2005037925 A1 | 4/2005 |

OTHER PUBLICATIONS

International Search Report and Written Opinion for PCT/US2008/059562 dated Jun. 23, 2008 (16 pgs).
International Search Report and Written Opinion for PCT/US2008/079618 dated Dec. 15, 2008 (7 pgs).
International Search Report and Written Opinion for PCT/US2008/079532 dated Dec. 2008 (8 pgs).

* cited by examiner

*Primary Examiner* — Joseph D Anthony
(74) *Attorney, Agent, or Firm* — Brian R. Morrison; Westman, Champlin & Koehler, P.A.

(57) ABSTRACT

The present invention provides an oxygen-scavenging composition and articles formed therefrom. The oxygen-scavenging composition preferably includes an oxygen-scavenging polymer having an unsaturated bicyclic group, a based polymer, and an optional oxidation catalyst. The base polymer preferably includes a substituted or unsubstituted addition backbone, which may include heteroatoms.

20 Claims, No Drawings

US 8,562,861 B2

OXYGEN SCAVENGING COMPOSITION AND ARTICLE FORMED THEREFROM

CROSS-REFERENCE TO RELATED APPLICATIONS

This application is the National Stage filing under 35 U.S.C. 371 of International Application No. PCT/US2008/079532 filed on Oct. 10, 2008, and entitled "Oxygen-Scavenging Composition and Article Formed Therefrom," which is incorporated herein by reference in its entirety.

TECHNICAL FIELD

This invention relates to oxygen-scavenging compositions and articles formed therefrom.

BACKGROUND

Historically, oxygen-sensitive products have been packaged and shipped in either glass or metal containers for delivery to the consumer. These containers have essentially zero gas permeability and, as such, the oxygen-sensitive products are able to remain fresh for an extended period of time.

There is a growing desire to package certain products such as, for example, foods and beverage products, in various plastic (e.g., PET, HDPE, PP, etc.) containers, wrapping, and other packaging articles. Compared to glass or metal packaging, plastic packaging is typically cheaper, more resistant to breakage, and more flexible (if desired). Conventional plastics, however, have generally functioned poorly at blocking oxygen passage relative to other available materials, such as glass or metal. The permeability of conventional plastics to oxygen transmission can result in short product shelf life, especially for products that are sensitive to degradation when exposed to oxygen.

Oxygen-scavenging materials have been incorporated into plastic containers in an attempt to maintain a low level of oxygen within the container, thereby extending the shelf life of the product. These plastic containers, however, have typically suffered from one or more deficiencies such as loss of adhesion, delamination, presence of off tastes or odors in products packaged therein, poor clarity, cost (e.g., material, storage, and/or transportation costs), insufficient oxygen-scavenging capacity and/or shelf life, and inefficient or untimely activation of oxygen scavenging.

Thus, there is a continuing need for improved oxygen-scavenging materials for use in packaging articles.

SUMMARY

In one aspect, the invention is an oxygen-scavenging composition suitable for use in a variety of application including, for example, in packaging articles. In some embodiments, the oxygen-scavenging composition includes an oxygen-scavenging polymer that includes a bicyclic oxygen-scavenging group preferably having at least one double bond located between atoms of a ring. The composition preferably further includes a base polymer and an optional oxidation catalyst. In one embodiment, the base polymer has a substituted or unsubstituted addition backbone (e.g., LDPE, HDPE, EVOH, EVA, etc.).

In another aspect, the invention provides methods for making the oxygen-scavenging composition described herein. In one embodiment, a Diels-Alder reaction is used to form a bicyclic oxygen-scavenging group that is included in the oxygen-scavenging polymer of the composition.

In another aspect, the invention provides articles that include oxygen-scavenging compositions described herein. In some embodiments, the articles comprises monolayer or multilayer packaging articles. In one embodiment, the article comprises a monolayer or multilayer flexible film such as a meat wrapper or a heat-seal film. In another embodiment, the article comprises a closure such as a bottle cap. In yet another embodiment, the article comprises a cup or bowl for packaging food or beverage products.

The above summary of the invention is not intended to describe each disclosed embodiment or every implementation of the invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

SELECTED DEFINITIONS

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., thrylene, pyridylene, etc.).

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "component" refers to any compound that includes a particular feature or structure. Examples of components include compounds, monomers, oligomers, polymers, and organic groups contained there.

The term "double bond" is non-limiting and refers to any type of double bond between any suitable atoms (e.g., C, O, N, etc.).

The term "triple bond" is non-limiting and refers to any type of triple bond between any suitable atoms.

The term "food-contact surface" refers to a surface of an article (e.g., a food or beverage container) that is in contact with, or suitable for contact with a food or beverage product.

The term "oxygen scavenging" means absorbing, consuming or reducing the amount of oxygen from a given environment.

The term "packaging article" as used herein includes both packaging articles in their final commercial form, as well as any intermediate stages. Preforms, which are frequently formed for plastic containers and other packaging articles, are one example of such an intermediate stage. The term includes at least films, bottles, containers, closures, closure liners, etc.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The term "polycarboxylic acid" includes both polycarboxylic acids and anhydrides thereof.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The invention provides an oxygen-scavenging composition ("OS composition") that preferably includes an oxygen-scavenging polymer ("OS polymer") having a bicyclic group, an optional base polymer, and an optional oxidation catalyst. The base polymer preferably includes a substituted or unsubstituted addition backbone, which may contain heteroatoms if desired. In certain embodiments, the base polymer includes an addition backbone is free, or substantially free, of heteroatoms.

The invention further provides coating compositions and articles, including, for example, articles for packaging oxygen-sensitive products, which include one or more layers of the OS composition of the invention. Examples of such packaging articles may include flexible or rigid articles for packaging oxygen-sensitive products such as oxygen-sensitive food or beverage products, medical products, computer parts, electrical parts, or other materials sensitive to oxygen. It is further contemplated that OS compositions of the invention may be used in non-packaging applications where oxygen-scavenging or barrier properties are desired.

The OS polymer can be of any suitable structure. For example, the OS polymer can have an addition backbone, a condensation backbone, or a combination thereof (e.g., backbone that includes both condensation and addition segments). The configuration of the backbone may vary depending upon a variety of considerations, including, for example, the type of OS polymer desired, the desired properties of a composition incorporating the OS polymer, and other materials with which the OS polymer will be mixed or contact.

Examples of suitable OS polymer include polyesters and copolyesters such as polyethylene terephthalate ("PET"), polybutylene terephthalate ("PBT"), polyethylene naphthalate ("PEN"), polybutylene naphthalate ("PBN") and any other suitable esters of acids and diols; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PI"), polyetherimide ("PEI") and polyamideimide ("PAI"); polyphthalamide; sulfones such as polysulfone ("PSul"); polyarylsulfone ("PAS") and poly ether sulfone ("PES"); polyaminoacids; polydimethylsiloxanes; polyolefins such as polyethylene ("PE"), polypropylene ("PP"), polybutylene ("PB"), and polybutadiene ("PBD"); styrenes such as polystyrene ("PS"), poly α-methyl styrene and styrene/acrylonitrile ("SAN"); vinyls such as polyvinyl chloride ("PVC") and polyvinylnaphthalene ("PVN"); mixtures thereof; and copolymers and derivatives thereof which preferably do not unsuitably interfere with oxygen scavenging. In certain preferred embodiments, the OS polymers are suitable for contacting food or beverage products.

As discussed in the above list, the OS polymer includes a condensation backbone. Some examples of suitable condensation backbones include any of the condensation polymers (i.e., polyester, polyamide, polyurethane, polycarbonate, etc.). Polyester (including copolyesters) backbones are preferred condensation backbones, with PET backbones being particularly preferred in certain embodiments.

In preferred embodiment, the OS composition of the invention include the OS polymer in combination with a suitable amount of one or more base polymers. Suitable based polymers can be thermoplastic, non-thermoplastic (e.g., thermosetting), or a mixture of both. Examples of such suitable include polymers include any of the polymer types described above with regards to the OS polymer construction. Preferably, the one or more additional polymers are formable polymers useful in forming a packaging article and are preferably suitable for contacting food or beverage products. The one or more additional polymers should also preferably exhibit a suitable level of compatibility with the OS polymer.

As discussed above, in certain preferred embodiments, the base polymer has an addition backbone, which may include one or more heteroatoms in certain embodiments. Unless indicated to the contrary, the term "addition backbone" as used herein in the context of the base polymer refers to addition backbones that may include one or more heteroatoms. In some embodiments, the addition backbone is preferably at least substantially free of heteroatoms (e.g., contains less than 1 heteratom (i.e., non-carbon or non-hydrogen atom) per 10 carbon atoms, less than 1 heteroatom per 20 carbon atoms, less than 1 heteroatom per 50 carbon atoms, etc.). Non-limiting examples of suitable addition backbones may include substituted or unsubstituted polyethylenes, polypropylenes, polyisoprenes, ethylene vinyl alcohols (EVOH), ethylene vinyl acetates (EVA), polyvinyl acetates (PVA), polymethyl methacrylate, polystyrene, polybutylene, polyvinylidene chloride, poly vinyl chloride, a copolymer or derivative thereof, styrene-butadiene rubbers (SBR) or other elastomers, or a mixture thereof. In certain preferred embodiments, the base polymer is a high-density polyethylene (HDPE), a low-density polyethylene (LDPE), a linear low-density polyethylene (LLDPE), polypropylene, EVA, EVOH, or a mixture thereof.

In some embodiments, the base polymer may include an addition backbone that includes one or more condensation segments. Such backbones may be formed using any suitable method, including, e.g., through polymerization of addition and condensation segments. For example, the base polymer may be formed using a condensation reaction between a dihydroxypolybutadiene (or other suitable addition oligomer having terminal functional groups capable of participating in a condensation reaction) and a polyethyleneterephthalate (or other suitable condensation oligomer having complementary functional groups relative to the addition oligomer).

In some embodiments, the backbone of the base polymer is free, or substantially free, of condensation segments.

OS polymers having condensation backbones such as, for example, PET tend to be relatively incompatible with addition base polymers such as, for example, polyolefins (e.g., HDPE, LDPE, etc). While not intending to be bound by any theory, the incompatibility of such polymers is often attributable to differences in the solubility parameters of the polymer materials in the blend. In articles containing a melt-blend layer of such materials, the incompatibility of the materials may give rise to a cloudy or hazy appearance, which may be undesirable in certain applications where a clear, or substantially clear, appearance is desired. For example, barrier layers having a cloudy or hazy appearance may be undesirable in certain food or beverage packaging articles such as juice bottles, meat wrappers, etc., where a cloudy or hazy appearance of the barrier layer may undesirably affect perceptions of the packaged product. In addition, incompatibility between materials can also lead to phase separation, which can result in mechanical failure, undesirable physical characteristics such as uncontrolled coefficient of friction, and variable permeation properties.

Thus, in certain embodiments it may be desirable to select an OS polymer and base polymer having characteristics that are sufficiently similar to yield a barrier layer that is free, or substantially free, of hazing and/or cloudiness and/or phase separation. One useful measure for assessing the compatibility of polymers is the Hildebrand solubility parameter ($\delta$). While not intending to be bound by any theory, polymer materials with similar Hildebrand solubility parameters ($\delta$) tend to be miscible with each other. Thus, in preferred embodiments, the OS polymer and base polymer have solubility parameters $\delta$, in $(\text{calories} \times \text{centimeters}^{-3})^{0.5}$ that differ by less than 10 $(\text{cal cm}^{-3})^{0.5}$, more preferably less than 1 $(\text{cal cm}^{-3})^{0.5}$, and even more preferably less than 0.1 $(\text{cal cm}^{-3})^{0.5}$. An example of a suitable computational procedure for determining Hildebrand solubility parameters is provided in Miscible Polymer Blends Background and Guide for Calculations and Design, Michael M. Coleman and Paul C. Painter, published by Destech, 2006.

When the base polymer is an addition polymer (e.g., EVOH, EVA, HDPE, LDPE, etc.) and the OS polymer has a condensation backbone (e.g., a polyester backbone such as PET), the OS polymer preferably includes one or more "compatibilizing" structural features to suitably compatibilize the OS polymer with the base polymer. Alternatively, the base polymer may be modified to suitably compatibilize the base polymer with the OS polymer.

In order to suitably compatibilize the base polymer and OS polymer, any suitable compatibilizing group or groups may be included in either the OS polymer and/or the base polymer. For example, substituted or unsubstituted hydrocarbon chains preferably including at least about 5 carbons atoms may be included in the OS polymer when the OS polymer has a condensation backbone and the base polymer has an additional backbone.

In certain preferred embodiments, the OS polymer has a condensation backbone with one or more side chain compatibilizing groups attached to the condensation backbone. Side chain groups that include substituted or unsubstituted hydrocarbon chains (e.g., substituted or unsubstituted alkyl or alkenyl groups) may be used to suitably compatibilize the OS polymer with a base polymer having an addition backbone. Any suitable compound may be used to provide such groups, including, for example, saturated or unsaturated fatty acids.

In some embodiments, the one or more side chain groups may have the structure represented by the following formula:

$$-X-R_1, \qquad (I)$$

where $R_1$ denotes a terminal organic group and X denotes an organic linking group for linking $R_1$ to another portion of the OS polymer (preferably a backbone portion). In preferred embodiments, $R_1$ is a substituted or unsubstituted alkyl or alkenyl group. Although not presently preferred, it is also contemplated that cycloalkyl or cycloalkenyl groups may also be employed as $R_1$ if desired. $R_1$ preferably includes at least about 5, more preferably at least about 8, and even more preferably at least about 12 carbon atoms. Preferably, $R_1$ includes less than about 30, more preferably less than about 26 and even more preferably less than about 24 carbon atoms. In a presently preferred embodiment, $R_1$ includes a bicyclic OS group of the invention. One or more bicyclic OS groups may be incorporated into $R_1$ through, for example, use of a Diels-Alder methodology.

In certain embodiments, $R_1$ is provided by an unsaturated fatty acid. Examples of suitable fatty acids may include arichidonic, eleostearic, linoleic, linolenic, oleic, palmitoleic, licanic acid and mixtures thereof. Since commercial feedstocks of unsaturated fatty acids typically include both saturated and unsaturated fatty acids, certain OS polymers of the present invention may include some $R_1$ groups formed from unsaturated fatty acids and other $R_1$ groups formed from saturated fatty acids.

It is also contemplated that compatibilizing groups may be included in the backbone of the OS polymer to suitably compatibilize the OS polymer with addition polymers (e.g., EVOH, EVA, HDPE, LDPE, etc.). For example, an OS polymer having a condensation backbone (e.g., a polyester backbone) may include backbone compatibilizing groups provided by compounds such as dimerized fatty acids. Similarly, other compounds that yield "addition-like" backbone segments may also be used.

As previously discussed, in some embodiments the OS polymer of the invention includes a polyester backbone. Methods for forming polyesters are well known in the art. For example, a polyester may be formed using one or more polyols and one or more diacids.

Suitable diacids include aromatic dicarboxylic acid components such as, but not limited to, terephthalic acid, isophthalic acid, naphthalic acid, 2,6-naphthalene dicarboxylic acid, other naphthalene dicarboxylic acid isomers, unsaturated acids such as maleic or fumaric acid, mixtures of dicarboxylic acid components, and anhydrides or derivatives thereof. The dicarboxylic acid components may be present as derivatives, such as, for example, bis-hydroxyethyl terephthalate. Aliphatic diacids such as succinic, glutaric, adipic, sebacic, and cyclohexanedicarboxylic acid, as well as substituted aliphatic diacids, may also be used.

Suitable polyols include, but are not limited to, aliphatic alcohols, cycloaliphatic alcohols, difunctional alcohols ("diols"), trifunctional alcohols ("triols"), tetrahydric or higher alcohols, and combinations thereof. Examples of some suitable polyols include ethylene glycol, propylene glycol, butylene glycol, neopentyl glycol, cyclohexane diol, cyclohexane dimethanol, hexane diol, glycerine, trimethylol propane ("TMP"), di trimethylolpropane, pentaerythritol, dipentaerythritol, trimethylol ethane, trimethylol butane substituted propane diols and triols (e.g., 2-methyl, 1,3-propane diol), substituted butane diols and triols, substituted pentane diols and triols, substituted hexane diols and triols, diethylene glycol and triols, derivatives thereof, and mixtures thereof.

The OS polymer can be of any suitable size. In preferred embodiments, the OS polymer has a number average molecular weight ($M_n$) of at least about 1,000, more preferably at least about 1,500, and even more preferably at least about 2,000. Preferably, the OS polymer has a $M_n$ of less than about 100,000, more preferably less than about 50,000, and even more preferably less than about 35,000. In one embodiment, the OS polymer has a $M_n$ from about 2,000 to about 3,000.

In some embodiments, the OS polymer may be formed via an unsaturated polyester polymer intermediate whereby bicyclic OS groups are added across the double bonds.

If desired, the OS polymer may be a branched or highly-branched polymer (e.g., a hyperbranched and/or dendridic polymer). For further discussion of highly branched oxygen scavenging polymer materials, see International App. No. PCT/US08/73839 by Joslin et al. The use of highly-branched OS polymers may be desirable in certain situations such as, for example, where a very high molecular weight OS polymer is desired without unsuitably increasing the intrinsic viscosity and/or an OS polymer with a high concentration of OS groups is desired.

As previously discussed, bicyclic OS groups of the invention preferably include at least one double bond, and more preferably at least one double bond located between atoms of a ring included in the bicyclic group. Examples of suitable double bonds include carbon-carbon ("C=C"), carbon-oxygen ("C=O"), carbon-nitrogen ("C=N"), nitrogen-nitrogen ("N=N"), and nitrogen-oxygen (N=O) double bonds, with C=C being preferred.

While not intending to be bound by theory, it is believed that such bicyclic OS groups may possess one or more of the following benefits: enhanced reactivity with oxygen, enhanced compatibilization of a polymer containing the bicyclic OS group with other materials, and/or reduced production of mobile oxidative cleavage fragments. While not intending to be bound by theory, the carbon-carbon double bonds present in unsaturated bicyclic groups such as norbornene are believed to exhibit enhanced oxygen-scavenging kinetics relative to carbon-carbon double bonds present in conventional acyclic oxygen-scavenging groups. The high level of ring strain typically present in unsaturated bicyclic groups is believed to contribute to the enhanced oxygen-scavenging kinetics. For further discussion of the reactivity of bicyclic compounds, see, for example, D. E. Van Sickek F. R. Mayo, R. M. Arluck JACS (32)1967, 3680 "Bridging of the cyclohexane ring has thoroughly deactivated the allylic bridgehead hydrogen atoms and increased the reactivity of the double bond by 8 to ninefold." By way of example, as discussed in international App. No. PCT/US08/59562 by Share et al., an unsaturated monomer functionalized with cyclopentadiene via a Diels-Alder reaction exhibited excellent oxygen scavenging performance when tested using a vial test oxygen scavenging methodology, whereas the unmodified unsaturated monomer did not.

In preferred embodiments, the bicyclic OS group includes a bicyclic structure represented by the IUPAC (International Union of Pure and Applied Chemistry) nomenclature Expression (I):

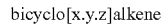

bicyclo[x.y.z]alkene

In Expression (I), x is an integer having a value of 2 or more, y and z are each an integer having a value of 1 or more, and the term alkene refers to the IUPAC nomenclature designation (e.g., hexene, heptene, heptadiene, octene, etc.) for a given bicyclic molecule.

In preferred embodiments, x has a value of 2 or 3 (more preferably 2) and each of y and z independently have a value of 1 or 2.

Examples of some suitable bicyclic OS groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred OS group.

It is contemplated that the bicyclic OS groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic OS group) or acyclic groups may be attached to the bicyclic group represented by Expression (I).

The OS polymer can contain any suitable number of bicyclic OS groups. While not intending to be bound by any theory, it is believed that the oxygen-scavenging ability of the bicyclic OS group is based on the presence of at least one double bond. Thus, it is believed that the number of bicyclic OS groups present in the OS polymer is an important factor in determining its oxygen-scavenging capacity. A sufficient number of bicyclic OS groups are preferably included to provide suitable oxygen-scavenging properties. The number of bicyclic OS groups included may vary depending on a variety of considerations, including, for example, the intended application (e.g., the level of oxygen-scavenging capacity and/or rate desired, including, for example, the level of "initial" oxygen scavenging upon product packaging, the thickness of an article or layer in which the OS polymer is to be employed, the desired concentration of OS polymer in an article or composition, etc.) and the amount of other types of oxygen-scavenging groups present in the composition containing the OS polymer and/or an article containing the OS composition.

The bicyclic OS groups can be located at any suitable location of the OS polymer, including, for example, in a backbone, a pendant group, or at both backbone and pendant locations.

If desired, the OS polymer and/or OS composition may further include one or more other OS groups (e.g., non-bicyclic OS groups). Non-limiting examples of such OS groups include a polyamide OS group such as the m-xylylene adipamide group present in MXD6 nylon (commercially available from Mitsubishi); a cycloalkenyl group such as a cyclohexenyl group; an unsaturated group such as a butadiene or polybutadiene group; or a mixture thereof.

In presently preferred embodiments, the bicyclic OS group is formed using a conjugated diene component that is preferably capable of participating in a Diels-Alder reaction with an unsaturated component (often referred to as a "dieneophile" in the context of a Diels-Alder reaction). Diels-Alder reactions (often referred to as [4+2]cycloadditions) typically involve the addition of an unsaturated component across the 1,4 positions of a conjugated diene component to form a cycloaddition reaction product that is typically cyclic or bicyclic in nature. Typically, at least one of the conjugated diene and unsaturated components contains one or more substituents that "activate" the component toward reaction, although in some instances one or both components can contain a "deactivating" substituent or substituents. The Diels-Alder reaction is generally considered to be a concerted reaction, and as such, either component can be the "electron donor" or "electron acceptor" depending upon the substituents bonded thereto.

The conjugated diene component used in the method of the invention can be any suitable type of compound that contains any suitable type and combination of conjugated double bonds. Examples of suitable double bonds include $C=C$, $C=O$, $C=N$, $N=N$, and $N=O$ double bonds, with $C=C$ being preferred. Typically the conjugated double bonds will be part of a cyclic group (including, e.g., cyclic, bicyclic, and fused rings). In some embodiments, the conjugated diene component is present in a polymer or polymer precursor. In some embodiments, the conjugated diene component includes an aromatic group preferably capable of participating in a Diels-Alder reaction. Examples of conjugated dienes capable of participating in Diels-Alder reactions to produce unsaturated bicyclic groups include anthracene, cyclohexadiene, cyclopentadiene (including, e.g., 1-alkyl cyclopentadienes or 2-alkyl cyclopentadienes), furan, isoprene, methyl vinyl ketone, thiophene, polymers and polymer precursors containing any of these, derivatives thereof, and combinations thereof.

Presently preferred conjugated diene components include at least one ring preferably having about 5 to about 8 atoms in the ring, and more preferably 5 or 6 atoms in the ring. In a particularly preferred embodiment, the conjugated diene component includes at least one 5-member ring, with cyclopentadiene being a presently preferred 5-member ring.

In a preferred embodiment, cyclopentadiene is reacted with a $C=C$ of an unsaturated component to yield a norbornene group.

Suitable unsaturated components of the invention include any components capable of participating in a Diels-Alder reaction to form a bicyclic OS group. The unsaturated component can be any suitable type of compound that contains one or more double or triple bonds. Examples of suitable double and triple bonds include $C=C$, $C=O$, $C=N$, $N=N$, $N=O$, carbon-carbon triple bonds ("$C\equiv C$"), and carbon-nitrogen triple bonds ("$C\equiv N$"), with $C=C$ bonds being presently preferred. In some embodiments, the unsaturated component is present in a polymer or polymer precursor.

As previously mentioned, the conjugated diene component and/or the unsaturated component may contain any suitable electron-donating group, electron-withdrawing group, or a combination of both. Diels-Alder reactions can typically be accelerated using groups that activate the reactant pair by making one of the conjugated diene or unsaturated components more electron-deficient and the other more electron-rich (e.g., by using an electron-withdrawing group on one reactant and an electron-donating group on the other). The electron-withdrawing or electron-donating effect of a given group on the conjugated diene or unsaturated components is typically exerted by a group located within one atom (i.e., alpha) of the reactive double or triple bond. That is, the electron-donating or electron-withdrawing group typically does not include an atom of the double or triple bond, but rather is bonded directly to an atom of the double or triple bond. Examples of electron-withdrawing groups include carbonyl (e.g., of an aldehyde, ketone, acid, ester, or amide group), nitrile, nitro, halo, substituted or unsubstituted aryl, hydroxy-methyl, amino- or substituted-aminomethyl, cyanomethyl, halomethyl and vinyl groups. Examples of electron-donating groups include straight chain, branched chain, and cyclic alkyl, amino, substituted amino, hydroxyl, and ether groups. In certain embodiments of the invention, one of the conjugated diene or unsaturated components contains one or more electron-donating group whereas the other contains one or more electron-withdrawing group.

OS polymers of the invention may be formed using a wide array of processes including, for example, reactor polymerization and reactive extrusion. In reactive extrusion, the components may be fed into the mixing zone of the extruder. The components may be mixed together before feeding into the extruder, or may be fed separately. Preferably, the components will be fed separately. As part of the extrusion process, the components will be subjected to elevated temperature, pressure, and shear as the components travel through the extruder. This process mixes the components, and also causes the components to react, forming the polymer composition.

One or more bicyclic OS groups can be incorporated into an OS polymer using any suitable reaction method, including, for example, (i) forming an OS polymer from a polymer precursor (e.g., a monomer or oligomer) containing a preformed bicyclic OS group, (ii) providing a preformed polymer and then modifying the polymer to contain the bicyclic OS group, or (iii) combining the reactants for forming the cyclic OS group with reactants (e.g., monomers and/or oligomers) for forming the polymer and reacting the combined reactants to form an OS polymer containing one or more bicyclic OS groups. The above reaction method (ii) is presently preferred for certain embodiments. While not intending to be bound by any theory, the above reaction method (ii) is believed to avoid undesirable side reactions that may occur under certain conditions.

An example of a method for forming the bicyclic OS group includes reacting a conjugated diene component with an unsaturated component to produce a polymer precursor (e.g., a monomer or oligomer) containing at least one bicyclic OS group. For example, an addition or condensation monomer containing one of the conjugated diene component or unsaturated component can be reacted with the other of the conjugated diene component or unsaturated component to form a monomer including a bicyclic OS group, whereby the monomer is capable of being polymerized into a polymer. Examples of suitable polymer precursors include unsaturated mono- or poly-acids (or anhydrides or esters thereof), alcohols, amines, isocyanates, thiols, vinyls, and combinations thereof. In certain embodiments, the unsaturated component is a polymer precursor in the form of an unsaturated fatty acid or unsaturated succinic anhydride derivative.

In some embodiments, polymer precursors containing at least one bicyclic OS group are incorporated into a polymer such that at least one condensation linkage group attaches the polymer precursor to another portion of the polymer. For example, in one such embodiment, the polymer precursor may be incorporated into a backbone of an OS polymer such that a pair of condensation linkage groups attach the polymer precursor to the backbone.

In another embodiment of the method of the invention, a preformed polymer that includes at least one of the unsaturated or conjugated diene components is provided. For example, a polymer having one or more double or triple bonds (i.e., the unsaturated component) capable of participating in a Diels-Alder reaction can be reacted with a conjugated dime component to form an OS polymer including one or more bicyclic OS groups, whereby the bicyclic OS group is located at the former site of the unsaturated component that participated in the reaction. By way of example, an unsaturated polyester can be reacted with cyclopentadiene to yield a polyester having one or more norbornene groups. In one embodiment, an unsaturated polyolefin such as a polybutadiene polymer (or a polymer containing butadiene or polybutadiene segments) may be functionalized with unsaturated bicyclic OS groups via a Diels-Alder reaction.

In some embodiments, a cyclopentadiene component is reacted with an unsaturated component, preferably in the form of a substituted or unsubstituted alkene, to form a monomer containing an unsaturated bicyclic structure. Examples of suitable substituted or unsubstituted alkenes include monounsaturated or polyunsaturated acids, alcohols, amines, isocyanates, thiols, vinyls, or combinations thereof. Monounsaturated or polyunsaturated fatty acids and succinic anhydride derivatives are presently preferred.

Suitable unsaturated succinic anhydride derivatives include, for example, reaction products of maleic anhydride and a substituted alkene. Suitable substituents for the alkene include, for example, saturated or unsaturated hydrocarbon chains that may be (i) linear or branched, and substituted or unsubstituted, as well as (ii) substituted or unsubstituted phenyl groups. Some of the substituents on the alkenyl group may be bound together as part of a ring structure. Preferred succinic anhydride derivatives include octenyl succinic anhydride (OSA), nonenyl succinic anhydride (NSA), heptenyl succinic anhydride (HSA), and the like. OSA, shown below in Formula (II), is particularly preferred.

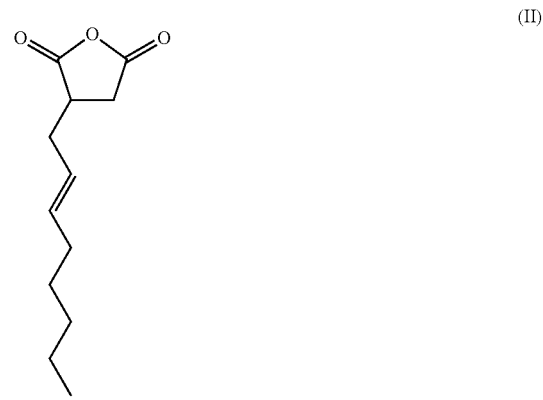

(II)

The benefits of using an unsaturated succinic anhydride derivative may include: ease of processing, general availability at low cost, ability to co-polymerize, compatibility with many polymers and monomers for reaction, stability during storage, and low toxicity. Unsaturated succinic anhydride derivatives may be reacted with a wide variety of materials, depending upon the type of polymer backbone desired. For example, a succinic anhydride derivative can be reacted with an alcohol or glycol to form a polyester. As another example, a succinct anhydride derivative may be reacted with an amine to form a polyamide.

For further information regarding unsaturated succinic anhydride derivatives and their use in forming polymers, see US Pub. No. 2006/0202161 by Share et al., which is incorporated herein by reference in its entirety.

While not wishing to be bound to any theory, Formula (III) below shows a preferred Diels-Alder reaction product that is believed to result from reacting OSA with cyclopentadiene.

The structure of Formula (III) is non-limiting with respect to stereochemistry and is intended to encompass all possible stereoisomers. As shown in Formula (III), the reaction product of OSA and cyclopentadiene is believed to include a norbornene bicyclic group.

In some embodiments, unsaturated fatty acids are reacted (e.g., prior to or after incorporation into a polymer) with a conjugated diene component to form fatty acids containing one or more unsaturated bicyclic OS groups. Examples of suitable fatty acids include mono- or polyunsaturated fatty acids such as arichidonic, eleostearic, erucic, licanic, linoleic, linolenic, oleic, palmitoleic, ricinoleic acid, and mixtures thereof. Other useful fatty acids may include mixtures of saturated and unsaturated fatty acids such as, for example, fatty acids from natural or modified oils such as linseed oil, soybean oil, sunflower oil, safflower oil, castor oil, and mixtures thereof. In a presently preferred embodiment, linoleic acid is reacted with cyclopentadiene in a Diels-Alder reaction to form a reaction product having at least one bicyclic OS group (which is believed to be a norbornene group).

Any suitable Diels-Alder reaction techniques or conditions can be employed to produce bicyclic OS groups of the invention. By way of example, a Diels-Alder reaction using cyclopentadiene to produce a bicyclic OS group can be carried out in a number of ways, including, for example, (i) combining dicyclopentadiene and an unsaturated component in a reaction vessel or (ii) separately cracking dicyclopentadiene to generate cyclopentadiene and then combining the cyclopentadiene and an unsaturated component in a reaction vessel.

By way of example, a suitable reaction product of dicyclopentadiene and an unsaturated component may be made using a Diels-Alder reaction process as follows: An unsaturated component is charged into a closed reactor purged with an inert gas such as nitrogen. The unsaturated component is heated to about 260° C. with constant stirring and dicyclopentadiene is added at a steady rate to the heated unsaturated component. While not intending to be bound by any theory, it is believed that the dicyclopentadiene dedimerizes into two molecules of cyclopentadiene in the reactor vessel, which then react with the double bonds of the unsaturated component. After the addition of the dicyclopentadiene is complete, heating of the reaction mixture is continued at a temperature of preferably not more than about 300° C., and even more preferably not more than about 275° C., for about 0.25 hour to about 5 hours. The reaction is generally permitted to proceed until substantially all of the cyclopentadiene has reacted with the unsaturated component. Thereafter, the reaction product is cooled and removed from the reaction vessel. For further discussion of Diels-Alder reaction conditions suitable for use with dicyclopentadiene, see for example, U.S. Pub. No. 2003/0036486, U.S. Pat. No. 5,693,715, and U.S. Pat. No. 5,288,805, which are incorporated herein by reference in their entirety.

OS compositions of the invention preferably include the OS polymer described herein, a base polymer, and one or more optional oxidation catalysts. In some embodiments, the OS composition further includes one or more optional additional polymers or additives.

An optional oxidation catalyst is preferably included. In some embodiments, the oxidation catalyst may enhance oxygen-scavenging properties by catalyzing an oxygen-scavenging reaction involving the bicyclic OS groups. A broad variety of metallic and organic compounds can catalyze the oxygen scavenging effect of certain oxygen-scavenging groups, and an appropriate compound may be selected based on any of cost, compatibility with the OS polymer and/or base polymer, compatibility with other polymers or ingredients in a blend, and compatibility with other layers in a multi-layered article. Examples of suitable oxidation catalysts include transition metals, complexes of transition metals, photoinitiators and the like, and mixtures thereof.

Examples of suitable oxidation catalysts include transition metals such as cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred catalysts include salts of cobalt and long chain acids such as, for example, cobalt acetate, cobalt neodecanoate, cobalt stearate, cobalt octoate, and mixtures thereof.

When included, the oxidation catalyst is preferably present in an amount sufficient to catalyze the oxygen-scavenging ability of the OS polymer in the end use application. The amount used will depend partially upon the catalyst chosen. In general, however, when using transition metal catalysts or complexes, the amount of transition metal catalyst or complex present in the end use application (e.g., in a monolayer article or in a layer of a multilayer article) may suitably be greater than about 1 ppm, preferably greater than about 10 ppm by weight, more preferably greater than about 25 ppm by weight, and even more preferably greater than about 35 ppm by weight, based on the total amount of transitional metal in the catalyst or complex relative to the total weight of the composition. The amount of transition metal catalyst or complex present in the end use application may suitably be less than about 10,000 ppm by weight, preferably less than about 1,000 ppm by weight, and more preferably less than about 600 ppm by weight, based on the total amount of transitional metal in the catalyst or complex relative to the total weight of the composition. In general, when using a photoinitiator or blend of photoinitiators, the amount of photoinitiator present may suitably be greater than about 0.01% by weight, and preferably greater than about 0.1% by weight of the total composition. The amount of photoinitiator present may suitably be less than about 10% by weight, and preferably less than about 5% by weight of the total composition.

The amount of oxidation catalyst present in the OS composition of the invention may vary widely depending upon, for example, the amount of OS composition to be included in an article and/or whether a masterbatch approach is to be employed (e.g., whereby an OS concentrate composition is combined with diluent materials to form the final material of a barrier layer). For example, if a monolayer article or layer(s) of a multilayer article is to be formed from neat OS composition (i.e., 100 wt-% OS composition), and a transition metal catalyst or complex is to be used, then the amount of transition metal catalyst or complex present in the OS composition is preferably as described above for a desired end use application. If, however, the OS composition is to be diluted with additional material in forming the monolayer article or layer(s), then the OS composition preferably includes a higher concentration of catalyst to account for the amount of dilution. Thus, for example, in an embodiment where an OS composition is to be diluted twenty-fold in an end use, the OS composition preferably has a catalyst concentration that is about twenty times higher than the catalyst concentration desired in the end use. Moreover, depending upon the approach employed in such embodiments, portions of the OS composition may have even higher concentrations of catalyst than that of the overall blend. For example, in some embodiments where the OS composition is a blend of two or more different types of particles, all or substantially all of the catalyst may be introduced into the blend through incorporation of a catalyst concentrate particle into the blend.

In some embodiments of the invention, the OS composition comprises a blend of the OS polymer and a base polymer, wherein the composition comprises from about 99 to about 1 wt-% of the OS polymer and from about 1 to about 99 wt-% of the base polymer, from about 95 to about 5 wt-% of the OS polymer and from about 5 to about 95 wt-% of the base polymer, from about 90 to about 10 wt-% of the OS polymer and from about 10 to about 90 wt-% of the base polymer, or from about 80 to about 20 wt-% of the OS polymer and from about 20 to about 80 wt-% of the base polymer.

In general, any suitable material can be added to the OS compositions of the invention that produces a desired result. For example, fillers, processing aids, plasticizers, fire retardants, anti-fog agents, crystallization aids, impact modifiers, surface lubricants, denesting agents, stabilizers, antioxidants, ultraviolet light absorbing agents, catalyst deactivators, colorants, nucleating agents, acetaldehyde reducing compounds, reheat enhancing aids, fillers, anti-abrasion additives, and the like, and combinations thereof can be included. In one embodiment, the OS composition includes the OS component described, an oxidation catalyst, an additional polymer (e.g., a structural base polymer) and a colorant.

Another aspect of the invention is an article incorporating OS compositions produced using methods of the invention. In preferred embodiments, OS compositions of the invention are particularly useful in oxygen-scavenging layers (also referred to as "oxygen barrier layers") of packaging articles. Packaging articles incorporating the OS composition of the invention can be used to package any product for which it is desirable to inhibit exposure to oxygen during storage. Examples of such products include certain food or beverage products (e.g., fruit juices, wine, beer, meat, etc.), pharmaceuticals, medical products, corrodible metals, and electronic devices.

Examples of packaging articles that may benefit from the OS composition of the invention include bottles (including bottle crowns, caps, and other closures), cups, bowls, cartons (including, e.g., paperboard or fiberboard cartons), containers, films, wraps (including, e.g., meat wraps), liners (e.g., crown, cap, or closure liners), coatings, trays, and flexible bags for industrial, commercial, medical, or residential use. The packaging articles may be rigid or flexible based on, for example, the number and type(s) of layers, the method of formation of the packaging article, and other relevant parameters. The articles may be formed by using the OS composition alone, by using a blend of the OS composition with one or more other polymers, or by using a multi-layer construction incorporating one or more layers including the OS composition. Additionally, the OS composition may be used as a coating, as a lining, or as part of a blend for a coating or lining of another article, such as a can, bottle, or container coating or lining. In some embodiments, the OS composition may be applied (either directly or via one or more intermediate layers) to a substrate such as a metal, plastic, fiberboard, or paperboard substrate.

Packaging articles incorporating OS compositions of the invention can be of any desired construction. The packaging articles can be formed from multiple layers of material (referred to as "multilayer" articles) or a single layer of material (referred to as "monolayer" articles). The packaging articles can include a single structural layer or a structural layer and one or more additional layers. The one or more additional layers can be, for example, a gas barrier layer (e.g., a layer incorporating a passive barrier material such as an ethylene-vinyl alcohol copolymer ("EVOH")), an oxygen-scavenging layer, a food-contact layer, a structural layer, an adhesive layer, or any layer that combines one or more of these, alone or in any combination. Multilayer packaging articles are typically prepared using coextrusion, injection molding, injection blow molding, stretch blow molding, coating, or lamination, among other techniques. Monolayer packaging articles are typically prepared by solvent casting, injection molding, blow molding, or by extrusion, among other techniques. A monolayer article is an article formed of substantially the same composition throughout.

A multilayer article may be produced that includes the OS composition in one or more layers. In some embodiments, a multilayer article may benefit from (i) placing one or more layers of another material between the atmosphere and the OS composition and/or (ii) placing one or more layers of another material between a packaged product and the OS composition. An outer layer of one or more layers may, for example, protect the OS composition from physical damage and assist in blocking or reducing migration of oxygen through a wall of the article. In such constructions, the OS composition will preferably scavenge any oxygen that penetrates the one or more layers located between the atmosphere and the OS composition. In addition, the OS composition is also preferably capable of scavenging oxygen that may be present inside a packaged product or within a headspace of the packaging article (if present).

The OS composition of the invention may be deployed neat to form an oxygen-scavenging layer of a monolayer or multilayer packaging article. Or, alternatively, prior to formation of the oxygen-scavenging layer of the packaging article, it can be blended (e.g., in the feedthroat of an extruder prior to article formation) with one more additional polymers or additives, which may, for example, reduce transportation and storage costs and/or help preserve the oxygen-scavenging capacity of the OS composition.

Articles of the invention can include any suitable amount of OS polymer. The amount of OS polymer included in such articles may vary depending upon a variety of considerations such as, for example, the desired oxygen-scavenging properties of the article, the efficacy of the OS polymer, the level of passive and/or active barrier properties of the base polymer (e.g., EVOH has good passive barrier properties whereas PP does not), cost, and the desired article properties, in preferred embodiments, monolayer or multilayer articles of the invention preferably include at least about 0.1 wt-%, more preferably at least about 0.5 wt-%, and even more preferably at least about 1.0 wt-% of the OS polymer, based on the total weight of the monolayer or multilayer article. In general, a monolayer or multilayer article will typically include less than about 15 wt-%, more preferably less than about 10 wt-%, and even more preferably less than about 5 wt-% of the OS polymer, based on the total weight of the monolayer or multilayer article. Typically, the concentration of OS polymer in a barrier layer of a multilayer article will be higher than that of a barrier layer of a monolayer article.

In some embodiments, articles of the invention include one or more barrier layers (of a multilayer or monolayer article) that include at least about 0.1 wt-%, more preferably at least about 0.5 wt-%, and even more preferably at least about 0.75 wt-% of OS polymer. Such barrier layers will typically include less than about 60 wt-%, more preferably less than about 40 wt-%, an even more preferably less than about 30 wt-% of OS polymer.

In some embodiments, a monolayer article is provided that includes about 85 wt-% or more of a base polymer and about 15 wt-% or less of OS polymer, more preferably about 90 wt-% or more of a base polymer and about 10 wt-% or less of OS polymer, and even more preferably about 95 wt-% or more of a base polymer and about 5 wt-% or less of OS polymer. A mixture of different base polymers may be used if desired.

In one embodiment, the invention provides a closure such as a bottle cap that includes the OS composition described herein. For example, the OS composition of the invention may be applied as a liner to an inner surface of a twist-off beverage bottle cap. In one such embodiment, the OS composition provides a cap liner composition consisting of a blend of the OS polymer of the invention, an EVA base polymer, and an oxidation catalyst.

Articles containing the OS composition of the invention are preferably storage stable for a prolonged period of time (e.g., at least days, weeks, or months) under normal atmospheric conditions without exhibiting unsuitable degradation in oxygen-scavenging properties, thereby avoiding costly storage techniques frequently associated with certain oxygen-scavenging articles.

In some embodiments, to preserve oxygen-scavenging capacity, the OS polymer is combined with oxidation catalyst just prior to, or during, formation of an oxygen-scavenging layer of a packaging article. Such a timing of oxidation catalyst addition may result in enhanced storage stability for (i) OS compositions of the invention prior to article formation and/or (ii) the resulting article. For example, preferred OS article of the invention may be storage stable under normal atmospheric conditions (e.g., ambient temperature, ambient humidity, and/or atmospheric air) for a prolonged period of time (e.g., weeks, months, etc.) without exhibiting an unsuitable degradation in oxygen-scavenging capacity, thereby avoiding costly storage techniques (e.g., storage under nitrogen gas, refrigeration, desiccation, etc.) frequently associated with certain oxygen-scavenging materials.

In some embodiments, the OS composition of the invention may include two or more parts, in which one or more part includes the OS polymer and a different part includes the oxidation catalyst. In one such embodiment, the composition is a blend of two or more types of particles (preferably thermoplastic particles such as thermoplastic pellets, flakes, powder, etc.) where (a) a first particle includes a blend of the OS polymer and a first base polymer, (b) a second particle includes a blend of an oxidation catalyst and a second base polymer, and (c) the first and second polymers are the same or different. The first particle may include any suitable amount of transitional metal catalyst or complex, including, for example, from about 1,000 ppm to about 40,000 ppm, from 5,000 ppm to about 30,000 ppm, or from about 10,000 ppm to about 25,000 ppm, based on the total amount of transitional metal in the catalyst or complex present in the first particles relative to the total weight of the first particles. In some embodiments, the second particles may be free, or substantially free, of oxidation catalyst. The above first and second particles may be combined at any suitable time to form a blend. For example, the above first and second particles may be combined to form a blend that may be stored for a period of time (e.g., days, weeks, months, etc.) before forming an article that includes the blend. Alternatively, the above first and second particles may be combined to form a blend just prior to forming an article from the blend, such as, for example, in the feedthroat of an injection molding machine or extruder. Thus, in some embodiments, the OS composition may be provided as a two-part (or more) kit or system including the above first and second particles, where the above first and second particles are not (or substantially are not) in contact with other.

Monolayer and multilayer articles of the invention may be formed from compositions of the invention using any suitable method. Examples of suitable methods include extrusion processes (including, e.g., co-extrusion), lamination processes, injection processes (including, e.g., co-injection), application of liquid coating compositions to at least a portion of a substrate, or a combination thereof. One or more precursor or intermediate articles, such as for example a preform, may be formed in route to the finished article.

In certain embodiments, to facilitate incorporation of the oxygen-scavenging materials described herein into an article, solid thermoplastic particles (e.g., pellets, flakes, powder, etc.) are formed which include the OS polymer described herein. Such thermoplastic particles may be formed, for example, by melt blending the OS polymer with a thermoplastic base polymer and/or an oxidation catalyst and pelletizing the resulting blend. In some embodiments, the thermoplastic particles may be formed from the OS polymer alone.

EXAMPLES

The invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Examples 1-3

Preparation of Polymer Precursors

Example 1

A polymer precursor containing a cyclic OS group in the form of a norbornene group was prepared as follows using 1.0 mole of trimethylol propane ("TMP") and 1.1 mole of cyclopentadiene-modified linseed oil fatty acid:

To a 4-neck round-bottom flask equipped with a mechanical stirrer, a packed column, Dean-Starke trap, condenser, and a thermocouple connected to a temperature control device, were added 405 parts of cyclopentadiene-modified linseed oil fatty acid (a Diels-Alder reaction product of cyclopentadiene and linseed oil fatty acids), 95 parts of TMP, and 0.5 parts of FASCAT 4201 (a dibutyltin oxide catalyst commercially available from Atofina). The mixture was heated to 210° C. over the course of about 70 minutes. After heating the mixture for an additional 4 hours, the mixture had an acid number of 0.8 and a hydroxyl number of 146. The mixture was then cooled and discharged from the flask.

Example 2

A polymer precursor containing a cyclic OS group in the form of a norbornene group was prepared as follows using 1.0 mole of pentaerythritol and 2.1 mole of cyclopentadiene-modified linseed oil fatty acid:

To a 4-neck round-bottom flask equipped with a mechanical stirrer, a packed column, Dean-Starke trap, condenser, and a thermocouple connected to a temperature control device, were added 1981.8 parts of dicyclopentadiene-modified linseed oil fatty acid (a Diels-Alder reaction product of dicyclopentadiene and linseed oil fatty acids), 274.4 parts pentaerythritol, and 2.2 parts FASCAT 4201. The mixture was heated to 210° C. over the course of about 3 hours. After heating the mixture for an additional 2 hours, the mixture had an acid number of 2 and a hydroxyl number of 90. The mixture was then cooled and discharged from the flask.

Example 3

A polymer precursor containing a cyclic OS group in the form of a norbornene group was prepared as follows using 2 moles of ethylene glycol and 1 mole of a Diels-Alder reaction product of cyclopentadiene and octenylsuccinic anhydride (referred hereinafter as "cyclopentadiene adduct of OSA"):

To a 4-neck round-bottom flask equipped with a mechanical stirrer, a packed column, Dean-Starke trap, condenser, and a thermocouple connected to a temperature control device, were added 372.5 parts of cyclopentadiene adduct of OSA, 127.5 parts of ethylene glycol, and 0.5 grams of FASCAT 4201. This mixture was heated to 220° C. over the course of about 2.5 hours. After 4 hours total at 220° C., the mixture had an acid number of 2.4 and a hydroxyl number of 179. The mixture was cooled and discharged at 150° C. from the flask.

Examples 4-8

Preparation of Polyester Os Polymers

Example 4

To a 4-neck round-bottom flask equipped with a mechanical stirrer, a packed column, Dean-Starke trap, condenser, and a thermocouple connected to a temperature control device, were added 435.5 parts of the polymer precursor of Example 1 and 64.5 parts of adipic acid. The mixture was heated to 210° C. over the course of about 2.5 hours. After 5 hours total at 210° C., the mixture had an acid number of 2.4 and a hydroxyl number of 31.5. The mixture was then cooled and discharged at 150° C. from the flask.

Example 5

To a 4-neck round-bottom flask equipped with a mechanical stirrer, a packed column, Dean-Starke trap, condenser, and a thermocouple connected to a temperature control device, were added 428 parts of the polymer precursor of Example 1 and 72 parts of adipic acid. The mixture was heated to 210° C. over the course of about 1.5 hours. The temperature of the mixture was raised to 220° C. and held for about 5.5 hours—at which point the mixture had an acid number of 1.8 and a hydroxyl number of 26.2. The mixture was cooled and discharged at 150° C. from the flask.

Example 6

To a 4-neck round-bottom flask equipped with a mechanical stirrer, a packed column, Dean-Starke trap, condenser, and a thermocouple connected to a temperature control device, were added 460.5 parts of the polymer precursor of Example 2 and 39.5 parts of adipic acid. This mixture was heated to 210° C. over the course of about 1.5 hours. The temperature of the mixture was raised to 220° C. After about 2 hours total at 220° C., the mixture had an acid number of 2.1 and a hydroxyl number of 19.4. The mixture was cooled and discharged at 150° C. from the flask.

Example 7

To a 4-neck round-bottom flask equipped with a mechanical stirrer, a packed column, Dean-Starke trap, condenser, and a thermocouple connected to a temperature control device, were added 455.5 parts of polymer precursor of Example 2 and 44.5 parts of isophthalic acid. This mixture was heated to 220° C. over the course of about 1.5 hours. After about 6.5 hours total at 220° C., the mixture had an acid number of 2.9 and a hydroxyl number of 23.2. The mixture was then cooled and discharged at 150° C. from the flask.

Example 8

To a 4-neck round-bottom flask equipped with a mechanical stirrer, a packed column, Dean-Starke trap, condenser, and a thermocouple connected to a temperature control device, were added 400 parts of the polymer precursor of Example 3 and 78.5 parts of adipic acid. This mixture was heated to 220° C. over the course of about 2.5 hours. After about 3 hours total at 220° C., the mixture had an acid number of 4.0. The mixture was then cooled and discharged at 150° C. from the flask.

Oxygen Scavenging Properties of the Polyester OS Polymers of Examples 4-8

A sample of 150 milligrams ("mg") of each of the polymer compositions of Examples 4-8 was mixed with 1,000 ppm of cobalt catalyst (6% w/w Cobalt Ten-Cex). The samples were each sealed in a 6 ml glass airtight vial containing ambient atmospheric air (i.e., about 21% oxygen). After 16 hours at ambient temperature, the amount of residual oxygen in the vials was measured using an Ocean Optics Foxy Oxygen Sensor System (available from Ocean Optics of Dunedin, Fla.), which uses fluorescence quenching to measure oxygen content. The results were measured after 2 minutes of exposure to the sensor. The results are provided below in Table 1.

TABLE 1

| | % Residual Oxygen at 16 Hours | | |
|---|---|---|---|
| Material | Vial 1 | Vial 2 | Mean |
| Example 4 | 0.9 | 1.7 | 1.3 |
| Example 5 | 2.2 | 2 | 2.1 |
| Example 6 | 2.2 | 0.6 | 1.4 |
| Example 7 | 2.4 | 4.1 | 3.3 |
| Example 8 | 1.2 | 2 | 1.6 |
| C1* | 22 | 21.3 | 21.7 |

*An empty control vial containing only atmospheric air was included as a negative control.

As shown in Table 1, good oxygen scavenging was observed for the compositions of Examples 4-8, which each included cyclic OS groups in the form of norbornene groups.

Example 9

In the following example, an oxygen scavenging polymer is produced by first making an unsaturated polyester and then reacting carbon-carbon double bonds of the polyester with cyclopentadiene.

Example 9.1

To a 4-neck round-bottom flask equipped with a mechanical stirrer, Dean-Starke trap, condenser, and a thermocouple connected to a temperature control device, were added 4839.6 parts of linseed oil fatty acid, 1160.4 parts pentaerythritol, and 6.0 parts FASCAT 4201 catalyst. The mixture was heated to 170° C. over the course of about 3 hours. After heating slowly to 200° C. and holding for 2 hours, the mixture had an acid number of 1.0 and a hydroxyl number of 157. The mixture was then cooled and discharged from the flask. 287 parts of water were collected.

Example 9.2

To a 4-neck round-bottom flask equipped with a mechanical stirrer, Dean-Starke trap, condenser, and a thermocouple connected to a temperature control device, were added 2281.2 parts of the adduct of Example 9.1 and 317 parts adipic acid. The mixture was heated to 210° C. over the course of about 6 hours. After holding for 4 hours, the mixture had an acid number of 2.4 and a hydroxyl number of 47.9. The mixture was then cooled and filtered through a 25 micron bag. 65 parts of water were collected.

Example 9.3

73.3 parts of the polymer prepared in Example 9.2 were placed in a Parr reactor with 26.7 parts of dicyclopentadiene. The reactor was heated to 240° C. over the course of 1 hour, and the pressure reached 50 psi (345 kPa). The reactor was held at 240° C. for 1 hour as the pressure became constant at 20 psi (138 kPa). The reactor was then vented and sparged with nitrogen for 1 hour, followed by vacuum at 29 inches of Hg (98.2 kPa) while holding at 240° C. The batch was then cooled and discharged.

Oxygen Scavenging Properties of the OS Polyester Polymer of Example 9

The oxygen-scavenging ability of the polyester polymer of Example 9 was assessed using the same methodology as described above for Examples 4-8, with the exception that a 200+/−20 mg sample of polymer was tested.

TABLE 2

| Material | % Residual Oxygen at 16 Hours | | | |
|---|---|---|---|---|
| | Vial 1 | Vial 2 | Vial 3 | Mean |
| Example 4 | 2.2 | 1.0 | 0.0 | 1.1 |
| Example 9 Run 1 | 3.3 | 2.3 | 2.5 | 2.7 |
| Example 9 Run 2 | 1.6 | 5.1 | 4.1 | 3.6 |
| C2* | 20.8 | 21.5 | 21.4 | 21.2 |

*An empty control vial containing only atmospheric air was included as a negative control. Theoretical oxygen concentration is 20.9%.

As shown in Table 2, good oxygen scavenging was observed for a composition including the polyester polymer of Example 9 (which is believed to include cyclic OS groups in the form of norbornene groups).

Example 10

Multilayer Packaging Articles

Multilayer Packaging articles were produced which contain the OS compositions described.

A 3-layer multilayer film comprised of two outer layers of PP with an EVOH layer positioned therebetween was produced in which the middle EVOH layer contained the OS polyester polymer of Example 9. This multilayer structure was formed by first producing two masterbatches. One masterbatch contained about 5-10 wt-% of the OS polyester polymer of Example 9 and 90-95 wt-% EVOH. A second masterbatch contained about 1-5 wt-% of a cobalt neodecanoate catalyst and 95-99 wt-% of EVOH. The two masterbatches were then blended together into EVOH and coextruded with PP on a 3-layer cast film line to produce a sheet with 99-90 wt-% PP/EVOH and 1-10 wt-% OS polyester polymer with catalyst, based on the total weight of the sheet. This sheet was then thermoformed into a cup suitable for food packaging end uses. Oxygen-scavenging tests were conducted and the cups exhibited oxygen-scavenging performance.

A 3-layer multilayer film comprised of a middle layer of MXD6 was prepared. In a similar manner, two masterbatches were prepared. One masterbatch contained 85-95 wt-% of Mitsubishi MXD6 nylon and 5-15 wt-% of OS polyester polymer of Example 9. The other masterbatch contained MXD6 nylon with a cobalt catalyst. These masterbatches were blended together with LDPE and used to produce a cast sheet with 90-99 wt-% of LDPE/MXD6 plus 1-10 wt-% OS polymer with catalyst. This sheet was then thermoformed into a cup suitable for food packaging.

A 5-layer film comprised of LLDPE (linear low-density polyethylene), a tie resin, EVOH, and the OS polyester polymer of Example 9 were produced on a cast film extrusion line. Various masterbatches were prepared using a twin-screw extruder, including masterbatches of the polyester polymer of Example 9 in LLDPE or EVOH and masterbatches of cobalt neodecanoate in EVOH or LLDPE. Several structures were evaluated, including LLDPE/Tie/EVOH/Tie/(LLDPE+OS-LLDPE masterbatch+Cobalt-LLDPE masterbatch), LLDPE/Tie/(EVOH+OS-EVOH masterbatch+Cobalt-EVOH masterbatch)/Tie/LLDPE. These films were then used as oxygen-scavenging lidding films after heatsealing them to the upper surface of PET food trays.

Example 11

Packaging Articles

Samples of formulations A and B were incorporated into films of a modified EVA (ethylene-vinyl acetate copolymer formulation) resin. Sample A was Dilulin, a cyclopentadiene-modified linseed oil manufactured by Cargill. Sample B was a OS polyester polymer similar to one of Examples 4-6. The incorporation was completed by adding 5.0 wt-% of each of the formulation into 95.0 wt-% of the EVA resin. The melt mixing of the two materials was completed by passing the blend through a Brabender single screw extruder. The materials were blended at a temperature of approximately 220° C., and had a residence time within the extruder of approximately 90 seconds. Once blended, the homogenized mixture was passed through a 6.0 inch film die to produce a cast film, which was approximately 4.0 inches wide and approximately 10 mils thick. Samples of the cast films were placed into airtight vessels. The vessels initially contained atmospheric air, which was approximately 21.0% oxygen. The vessels were stored for approximately 8 weeks under ambient conditions. After the 8-week storage period, the internal oxygen level of each vessel was determined. Positive active oxygen scavenging was validated through a reduction of the level of oxygen within the interior of the vessel. The data is provided below in Table 3.

The testing conditions used were as follows:

Sample Size: Approximately 5.0-6.0 g (5.5 g nominal) of film (0.250-0.300 g scavenger formula);

Temperature: Ambient (20-25° C.); and

Vessel Volume: 150 cubic centimeters (empty. 140 cubic centimeters with film).

TABLE 3

| Sample | Initial Oxygen Concentration | Final Oxygen Concentration | Formulation Scavenging Capacity* |
|---|---|---|---|
| Formula A | 21.0% | 15.8% | 26.5 cc/g |
| Formula B | 21.0% | 16.5% | 21.4 cc/g |

*Average scavenging capacity of three measurements, film mass 5.5 g, and scavenger concentration 5.0%.

A composition similar to Formula S was used as an inner liner of a 38-millimeter polyethylene beverage container cap. The cap was sealed to an empty metal tube of a Mocon testing unit running nitrogen gas, which was used to measure the oxygen permeation rate of the cap in cubic centimeters per day. Suitable oxygen-scavenging performance was exhibited by the cap.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A packaging article comprising:
a barrier layer that includes:
at least about 40 weight percent of a base polymer having a substituted or unsubstituted addition backbone;
at least about 0.1 weight percent of an oxygen-scavenging polymer having an unsaturated bicyclic group and a condensation backbone that may optionally include addition segments; and
an oxidation catalyst.

2. The packaging article of claim 1, wherein the bicyclic group comprises a structure represented by the nomenclature expression:

bicyclo[x,y,z]alkene;

wherein:
x is 2 or more, and
y and z are each at least 1.

3. The packaging article of claim 1, wherein the bicyclic group comprises bicyclo[2.1.1]hexene, bicyclo[2.2.1]heptene, bicyclo[2.2.1]heptadiene, bicyclo[2.2.2]octene, bicyclo[2.2.2]octadiene, or a mixture thereof.

4. The packaging article of claim 1, wherein a pendant group attached to a backbone of the oxygen-scavenging polymer includes the bicyclic group.

5. The packaging article of claim 4, wherein the pendant group is formed using an unsaturated fatty acid as a feedstock.

6. The packaging article of claim 1, wherein the base polymer and the oxygen-scavenging polymer have solubility parameters that differ by less than 10 (calories-centimeters$^{-3}$)$^{0.5}$.

7. The packaging article of claim 6, wherein the condensation backbone comprises a polyester, copolyester, polyamide, polycarbonate, polyether, polyurethane, polyepoxide, polylactone, a derivative or copolymer thereof, or a mixture thereof.

8. The packaging article of claim 6, wherein a pendant group including a substituted or unsubstituted hydrocarbon chain comprising at least 5 carbon atoms is attached to the condensation backbone.

9. The packaging article of claim 6, wherein the oxygen-scavenging polymer comprises a polyester polymer.

10. The packaging article of claim 1, wherein the base polymer comprises a substituted or unsubstituted polyethylene, a low-density polyethyelene (LDPE), a high-density polyethylene (HDPE), a polypropylene, a polyisoprene, an ethylene vinyl alcohol (EVOH), an ethylene vinyl acetate (EVA), a polyvinyl acetate (PVA), a polymethyl methacrylate, a polystyrene, a polybutylene, a polyvinylidene chloride, a poly vinyl chloride, a styrene-butadiene rubber (SBR), a copolymer or derivative thereof, or a mixture thereof.

11. The packaging article of claim 1, wherein the base polymer comprises an ethylene vinyl alcohol (EVOH).

12. The packaging article of claim 1, wherein the base polymer comprises an ethylene vinyl acetate (EVA).

13. The packaging article of claim 1, wherein the addition backbone of the base polymer includes one or more heteratoms.

14. The packaging article of claim 1, wherein the oxidation catalyst comprises from about 10 ppm to about 1,000 ppm of a transition metal, a complex of a transition metal, a photoinitiator or a mixture thereof.

15. The packaging article of claim 1, wherein the oxidation catalyst comprises a cobalt, a cobalt oxide, a cobalt chloride, a cobalt salt of a long chain acid, or a mixture thereof.

16. The article of claim 1, wherein the article comprises a multi-layer article.

17. A method, comprising:
providing an oxygen-scavenging composition that includes:
at least about 40 weight percent of a base polymer having a substituted or unsubstituted addition backbone that is at least substantially free of heteroatoms;
at least about 0.1 weight percent of an oxygen-scavenging polymer having a bicyclic group that includes a double bond and a condensation backbone that may optionally include addition segments; and
an oxidation catalyst; and
forming a packaging article having a barrier layer formed from the oxygen-scavenging composition.

18. The method of claim 17, wherein the bicyclic group comprises a structure represented by the nomenclature expression:

bicyclo[x,y,z]alkene;

wherein:
x is 2 or more, and
y and z are each at least 1.

19. The method of claim 17, wherein the oxygen-scavenging polymer comprises a polyester polymer.

20. The method of claim 17, base polymer and the oxygen-scavenging polymer have solubility parameters that differ by less than 10 (calories-centimters$^{-3}$)$^{0.5}$.

* * * * *

UNITED STATES PATENT AND TRADEMARK OFFICE
CERTIFICATE OF CORRECTION

PATENT NO. : 8,562,861 B2 Page 1 of 1
APPLICATION NO. : 13/123431
DATED : October 22, 2013
INVENTOR(S) : Share et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 289 days.

Signed and Sealed this
Fifteenth Day of September, 2015

Michelle K. Lee
*Director of the United States Patent and Trademark Office*